US011941389B1

(12) United States Patent
Lamb

(10) Patent No.: US 11,941,389 B1
(45) Date of Patent: Mar. 26, 2024

(54) SYSTEMS AND METHODS FOR PROVIDING CUSTOMIZED FIRMWARE PACKAGES TO A LOCKING DEVICE

(71) Applicant: Lockmasters, Inc., Nicholasville, KY (US)

(72) Inventor: Brian K. Lamb, Nicholasville, KY (US)

(73) Assignee: Lockmasters, Inc., Nicholasville, KY (US)

( * ) Notice: Subject to any disclaimer, the term of this patent is extended or adjusted under 35 U.S.C. 154(b) by 0 days.

(21) Appl. No.: 18/485,897

(22) Filed: Oct. 12, 2023

(51) Int. Cl.
*G06F 8/65* (2018.01)
*G07C 9/00* (2020.01)

(52) U.S. Cl.
CPC .......... *G06F 8/65* (2013.01); *G07C 9/00174* (2013.01); *G07C 2009/00769* (2013.01)

(58) Field of Classification Search
USPC ........................................................ 717/168
See application file for complete search history.

(56) References Cited

U.S. PATENT DOCUMENTS

| 10,581,850 | B2 | 3/2020 | Conrad | |
|---|---|---|---|---|
| 10,990,373 | B2* | 4/2021 | Olderdissen | G06F 8/71 |
| 2007/0245369 | A1 | 10/2007 | Thompson et al. | |
| 2011/0191764 | A1* | 8/2011 | Piorecki | G06F 8/65 |
| | | | | 717/172 |
| 2012/0084767 | A1* | 4/2012 | Ishimoto | G06F 8/65 |
| | | | | 717/173 |
| 2014/0196024 | A1* | 7/2014 | Hanon | G06F 8/654 |
| | | | | 717/178 |
| 2018/0260208 | A1 | 9/2018 | Lin | |
| 2018/0359144 | A1* | 12/2018 | Malaspina | H04L 41/082 |
| 2020/0012488 | A1* | 1/2020 | Koval | G06F 8/71 |
| 2020/0034141 | A1* | 1/2020 | Bilal | G06F 8/71 |
| 2022/0172538 | A1 | 6/2022 | De Marcillac et al. | |
| 2022/0229654 | A1 | 7/2022 | Bliding | |

FOREIGN PATENT DOCUMENTS

| CN | 113269909 | A | 8/2021 |
|---|---|---|---|
| JP | 5686269 | B1 | 3/2015 |
| JP | 2023041393 | A | 3/2023 |
| WO | 202298510 | A1 | 5/2022 |

\* cited by examiner

*Primary Examiner* — Qing Chen
*Assistant Examiner* — Clint Thatcher
(74) *Attorney, Agent, or Firm* — Wood Herron & Evans LLP

(57) ABSTRACT

A method for updating firmware of a locking device includes establishing a connection between a user device and the locking device and providing a set of firmware packages for display on a user interface of an application. The method includes receiving data indicative of a firmware package that has been selected via the user interface of the application. The method includes completing a transaction involving the firmware package. The method includes receiving, from an application server, installation data for the firmware package that has been selected. The method includes providing the installation data for the firmware package to the locking device to cause the locking device to use the installation data to update the firmware of the locking device, wherein the firmware, once installed on the locking device, allows for reconfiguration of firmware-controlled functions and operating modes of the locking device by supplementing or replacing firmware of the locking device.

16 Claims, 11 Drawing Sheets

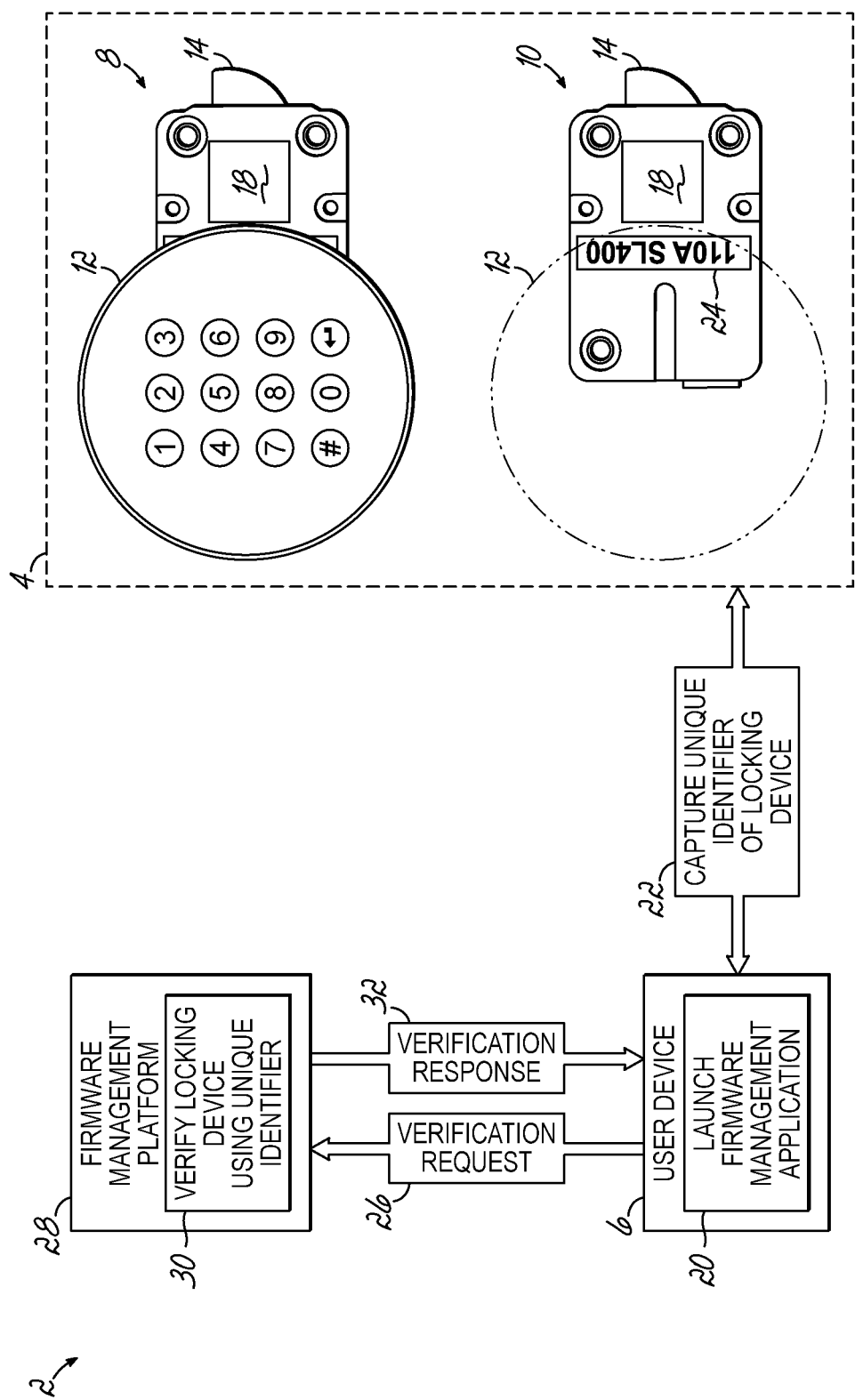

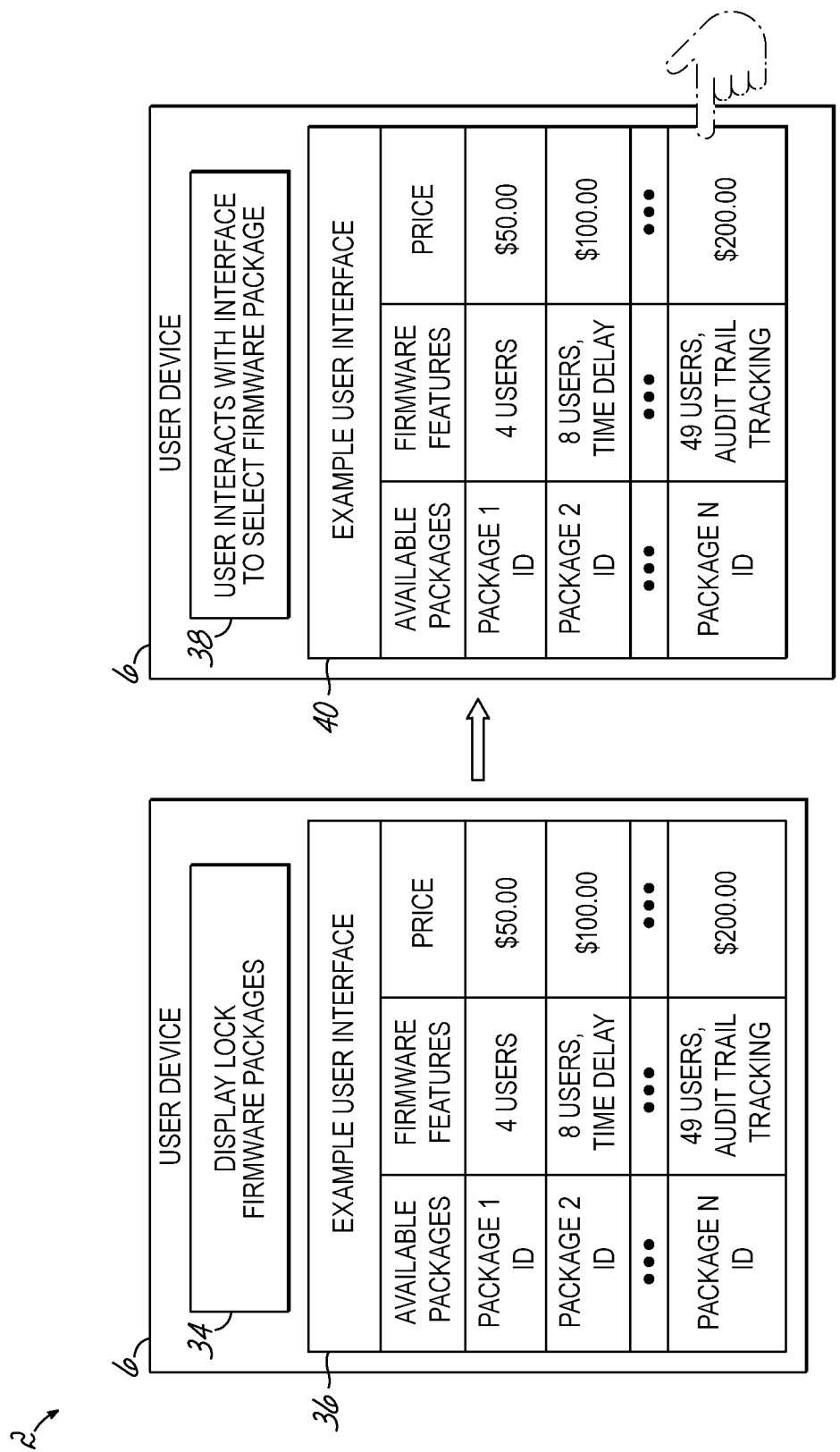

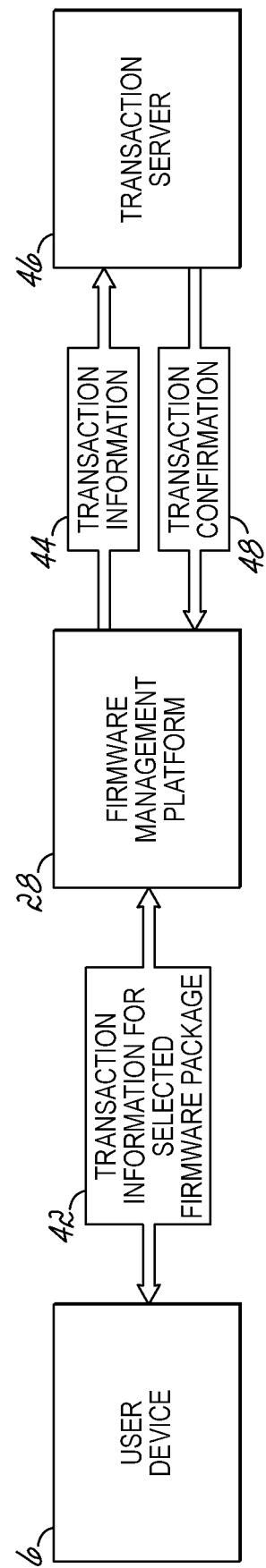

SYSTEMS AND METHODS FOR PROVIDING CUSTOMIZED FIRMWARE PACKAGES TO A LOCKING DEVICE

TECHNICAL FIELD

This invention relates generally to systems, methods, and/or devices used to update firmware of a locking device, and particularly to systems, methods, and/or devices used to provide customized updates to the firmware of the locking device.

BACKGROUND

Locks serve a fundamental purpose in security systems by controlling access to spaces, objects, and/or information. A lock can be mechanical, electrical, or can combine mechanical and electrical elements to offer convenience and to enhance security.

An electronic lock utilizes firmware, stored in memory, which can be executed by a central processing unit (CPU) to control one or more hardware components of the lock. However, updating the firmware of the lock can be difficult and cumbersome. For example, many locks are constructed such that firmware can only be updated when the lock body is disassembled. Additionally, updating the firmware via a remote server can be difficult when the lock is not connected to a network.

Furthermore, an organization may need a specific package of firmware features implemented on a lock. However, if the firmware packages offered are static, the organization may be unable to implement the desired firmware features on the lock. Still further, firmware needs of the organization change over time. Consequently, when the organization needs different or additional firmware features, conventional methods do not provide a user-friendly way in which the organization can update the firmware of the lock. For example, International Patent Application No. WO 2022098104 A1 provides a mechanism for automatically updating the firmware of the lock, but does not provide a way for the user to customize firmware features while efficiently and effectively deploying updates to implement those customized features. Due to this limitation, original equipment manufacturers (OEMs) construct locks with different firmware features and the organization has to replace the lock in its entirety when new or updated firmware is needed. This puts a financial burden on the organization in situations where the organization utilizes hundreds, even thousands, of locks.

Accordingly, there is a need for a device, system, and/or method that enables a lock owner (e.g., an organization, an individual, etc.) to select customizable firmware features for locks while efficiently and effectively deploying a firmware update to implement the customized firmware features on the lock.

SUMMARY OF THE INVENTION

The present invention provides a system and/or method for providing an emergency responder with immediate access to access information for a secure site during a crisis or critical situation.

In an aspect of the invention, a method for updating firmware of a locking device is disclosed. The method includes establishing a connection between a user device and the locking device. The method further includes providing, by the user device, a set of firmware packages for display on a user interface of an application that offers updates to firmware of locking devices. The method further includes receiving, by the user device, data indicative of a firmware package, of the set of firmware packages, that has been selected via the user interface of the application. The method further includes completing, by the user device, a transaction involving the firmware package to cause an application server to receive data indicating that the transaction has been completed. The method further includes receiving, by the user device and from the application server, installation data for the firmware package that has been selected. The method further includes providing, by the user device, the installation data for the firmware package to the locking device to cause a processor of the locking device to use the installation data to update the firmware of the locking device with one or more firmware features included in the firmware package. The one or more firmware features, once installed on the locking device, allow for reconfiguration of firmware-controlled functions and operating modes of the locking device by supplementing or replacing original firmware of the locking device.

In another embodiment of the invention, prior to providing the set of firmware features for display on the user interface, the method further includes obtaining a unique identifier located on a body of the locking device. The method further includes providing the unique identifier to the application server to cause the application server to use the unique identifier to verify the locking device and to provide the user device with a response message indicating that the locking device is a registered lock.

In another embodiment of the invention, the unique identifier indicates a type or model of the locking device. In this embodiment, the method further includes receiving, from the application server, data identifying a list of firmware packages that have been recommended based on the type or model of the locking device. The method further includes updating the set of firmware packages displayed on the user interface based on the data identifying the list of firmware packages that have been recommended.

In another embodiment of the invention, providing the set of firmware packages for display on the user interface includes providing the set of firmware packages for display in association with information identifying a price of each respective firmware package of the set of firmware packages.

In another embodiment of the invention, the firmware package is a first firmware package. In this embodiment, the method further includes receiving data indicative of a second firmware package, of the set of firmware packages, that has been selected via the user interface of the application. The method further includes completing a transaction involving the second firmware package to cause the application server to receive data indicating that the transaction involving the second firmware package has been completed. The method further includes receiving, from the application server, installation data for the second firmware package that has been selected. The method further includes providing the installation data for the second firmware package to the locking device to cause the processor of the locking device to update the firmware of the locking device with one or more firmware features included in the second firmware package.

In another embodiment of the invention, the method further includes providing, for display on the user interface, a list of token packages, wherein each token package includes one or more tokens and is displayed in association with information identifying a price for the one or more tokens included in the respective token package. In one version of this embodiment, the set of firmware packages are provided for display on a first portion of the user interface of the application and the list of token packages are provided for display on a second portion of the user interface of the application.

In another embodiment of the invention, the one or more firmware features of the firmware package comprises at least one of: a feature indicating a number of user accounts permitted to access the locking device, a feature providing audit trail tracking, one or more time delay features, a feature providing biometric authentication, a feature providing automatic locking, a feature providing multifactor authentication, a feature specifying permissible times during which the locking device is capable of being locked or unlocked, or a feature indicating a remaining amount of battery left on the locking device.

In another embodiment of the invention, the firmware of the locking device, once updated with the one or more firmware features, is programmable from the user device.

In another embodiment of the invention, the firmware of the locking device, once updated with the one or more firmware features, is programmable from an interface of the locking device.

In another aspect of the invention, a user device is disclosed. The user device includes a memory storing instructions and a processor. The processor, when executing the instructions, is to establish a connection with a locking device. The processor is further to provide a set of firmware packages for display on a user interface of an application that offers updates to firmware of locking devices. The processor is further to receive data indicative of a firmware package, of the set of firmware packages, that has been selected via the user interface of the application. The processor is further to complete a transaction involving the firmware package to cause an application server to receive data indicating that the transaction has been completed. The processor is further to receive, from the application server, installation data for the firmware package that has been selected. The processor is further to provide, via the connection that has been established, the installation data for the firmware package to the locking device to cause a processor of the locking device to use the installation data to update the firmware of the locking device with one or more firmware features included in the firmware package that has been selected via the user interface of the application. The one or more firmware features, once installed on the locking device, allow for reconfiguration of firmware-controlled functions and operating modes of the locking device by supplementing or replacing original firmware of the locking device.

In an embodiment of the invention, the processor, when providing the set of firmware packages for display on the user interface, is to provide the set of firmware packages for display in association with information identifying a price of each respective firmware package of the set of firmware packages.

In another embodiment of the invention, the processor is further to provide a list of token packages for display on the user interface. Each token package includes one or more tokens and is displayed in association with information identifying a price for the one or more tokens included in the respective token package. The set of firmware packages are provided for display on a first portion of the user interface of the application and the list of token packages are provided for display on a second portion of the user interface of the application.

In another aspect of the invention, a non-transitory computer-readable medium is disclosed. The non-transitory computer-readable medium stores one or more instructions that, when executed by a processor of a device, cause the processor to establish a connection with a locking device. The one or more instructions further cause the processor to provide a set of firmware packages for display on a user interface of an application that offers updates to firmware of locking devices. The one or more instructions further cause the processor to receive data indicative of a firmware package, of the set of firmware packages, that has been selected via the user interface of the application. The one or more instructions further cause the processor to complete a transaction involving the firmware package to cause an application server to receive data indicating that the transaction has been completed. The one or more instructions further cause the processor to receive, from the application server, installation data for the firmware package that has been selected. The one or more instructions further cause the processor to provide, via the connection that has been established, the installation data for the firmware package to the locking device to cause a processor of the locking device to use the installation data to update the firmware with one or more firmware features included in the firmware package that has been selected. The one or more firmware features, once installed on the locking device, allow for reconfiguration of firmware-controlled functions and operating modes of the locking device by supplementing or replacing original firmware of the locking device.

In an embodiment of the invention, the one or more instructions cause the processor to provide the set of firmware packages for display in association with information identifying a price of each respective firmware package of the set of firmware packages.

In another embodiment of the invention, the one or more instructions further cause the processor to provide a list of token packages for display on the user interface. Each token package includes one or more tokens and is displayed in association with information identifying a price for the one or more tokens included in the respective token package. The set of firmware packages are provided for display on a first portion of the user interface of the application and the list of token packages are provided for display on a second portion of the user interface of the application.

In another aspect of the invention, a system for updating firmware of locking devices is disclosed. The method includes a plurality of locking devices, an application server, and a plurality of user devices including at least a first user device and a second user device. The first user device is configured to provide, for display on a user interface of an application that offers updates to firmware of locking devices, a set of firmware packages and a set of token packages. The first user device is further configured to receive data indicative of a token package, of the set of token packages, that has been selected via the user interface of the application. The first user device is further configured to complete a transaction involving the token package to cause the application server to receive data indicating that the transaction has been completed. The second user device is configured to establish a connection with a locking device of the plurality of locking devices. The second user device is further configured to receive data indicative of a firmware package, of the set of firmware packages, that has been selected via the user interface of the application. The second user device is further configured to use a token from the token package to complete a transaction involving the firmware package, wherein completion of the transaction causes an application server to receive data indicating that the transaction has been completed. The second user device is further configured to receive, from the application server, installation data for the firmware package that has been selected. The second user device is further configured to provide, via the connection that has been established, the installation data for the firmware package to the locking device to cause a processor of the locking device to use the installation data to update the firmware with one or more firmware features included in the firmware package.

Other aspects, features, benefits, and advantages of the present invention will become apparent to a person of skill in the art from the detailed description of various embodiments with reference to the accompanying drawing figures, all of which comprise part of the disclosure.

BRIEF DESCRIPTION OF THE DRAWINGS

FIGS. 1A-1E are diagrams of an example process for customizing and updating firmware of a locking device.

DETAILED DESCRIPTION

Figure 1A:
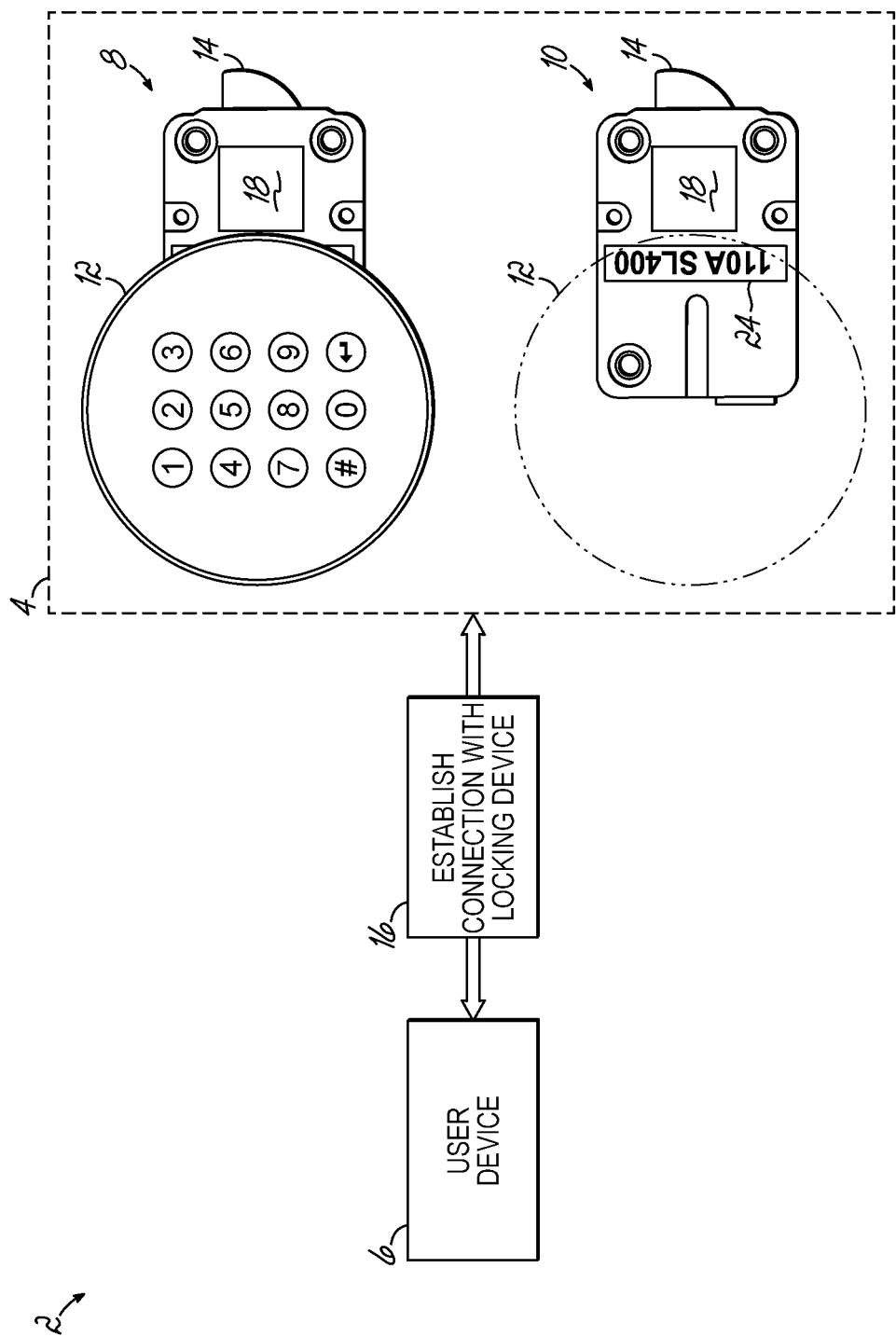

With reference to the drawing figures, this section describes particular embodiments and their detailed construction and operation. Throughout the specification, reference to "one embodiment," "an embodiment," or "some embodiments" means that a particular described feature, structure, or characteristic may be included in at least one embodiment. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

FIGS. 1A-1E are diagrams of an example process 2 for customizing and updating firmware of a locking device 4. The firmware of the locking device 4 may be customized and updated using a user device 6 that has access to a firmware management application. The firmware management application allows a user to obtain packages of customized firmware features and allows the user device 6 to orchestrate installation of those firmware features on the locking device 4.

The locking device 4 may be a swing bolt lock, a dead bolt lock, a motor bolt lock, a spring bolt lock, and/or another type of lock. The specific mechanical operating structures defining the locking device 4 may be modified to other known designs and combinations without departing from the scope of this invention. The user device 6 may be a mobile phone (e.g., a smart phone, etc.), a tablet computer, a laptop computer, a handheld computer, a server computer, a wearable communication device, and/or another type of device.

One or more embodiments described herein involve the transmission of data between devices. Data transmission between devices may be protected using one or more encryption techniques. For example, a first device may encrypt data for transmission to a second device, and the second device may use a key to decrypt the received data. In some embodiments, encryption/decryption can be performed using a symmetric encryption technique, such as a technique using an advanced encryption standard (AES), a technique using a data encryption standard (DES), and/or the like. In some embodiments, encryption/decryption can be performed using an asymmetric encryption technique, such as a Diffie-Hellman key exchange technique, a Rivert-Shamar-Adleman (RSA) encryption technique, an Elgamal encryption technique, and/or the like.

In FIG. 1A, reference numbers 8 and 10 depict the locking device 4 with and without a locking mechanism 12. For example, reference number 8 shows the locking device 4 with the locking mechanism 12 and reference number 10 shows the locking device 4 without the locking mechanism 12. The locking mechanism 12 may be mechanical, electronic, or a combination thereof. The locking mechanism 12 may be a keypad, a combination dial, a keyhole, an interface supporting biometric data, and/or another type of lock. In the example shown, the locking mechanism 12 is a keypad. The keypad may, for example, be a digital keypad where a user has to input an access code to unlock the locking device 4.

The locking device 4 includes a latch 14. The latch 14 may be adjustable between a first position indicative of the locking device 4 being unlocked and a second position indicative of the locking device 4 being locked. As would be understood by one skilled in the art, the term latch may refer to a latch, a bolt, hook, a clasp, a toggle, a snap, and/or the like.

As shown by reference number 16, the user device 6 may establish a connection with the locking device 4. In some embodiments, the connection may be a wired connection. For example, the user device 6 may establish a direct connection with the locking device 4 by connecting the user device 6 and the locking device 4 using a universal serial bus (USB) cable, an ethernet cable, a cable customized to fit a particular type of lock, and/or the like.

In some embodiments, the connection may be a wireless connection. For example, the user device 6 may complete a pairing process to establish a Bluetooth connection with the locking device 4. As would be understood by one of ordinary skill in the art, the steps for establishing a Bluetooth connection include device discovery, device pairing (sending a pairing request, receiving a pairing response), a passkey verification step, and a connection setup step. In some embodiments, a body of the locking device 4 may include a quick scan (QR) code 18 and the user device 6 may scan the QR code 18 to establish the Bluetooth connection. In this example, the QR code 18 may store Bluetooth pairing instructions. When the QR code 18 is scanned, the user device 6 may translate the Bluetooth pairing instructions and may initiate the pairing process to establish the connection.

As shown in FIG. 1B, the user device 6 may verify that the locking device 4 is a registered lock. The term "registered lock" refers to a locking device that has been authorized for use and reconfiguration of firmware and that has been purchased by a user or organization.

Prior to verifying the locking device 4, as shown by reference number 20, the user device 6 may first launch the firmware management application. In some embodiments, the firmware management application is installed on the user device 6. In some embodiments, the firmware management application is a web application accessible via the Internet. In this case, the web application can be accessed by inputting a uniform resource locator (URL) into the browser of the user device 6. Additionally, or alternatively, the QR code 18 may be used to access the web application. For example, the QR code 18, once scanned by the user device 6, may populate a hyperlink that, once selected by a user, causes the firmware management application to load on the browser of the user device 6.

In some embodiments, a user may log into an account that has been established with the firmware management application. To login, the user may input login credentials into a user interface of the firmware management application. In some embodiments, the user may create an account with the firmware management application and may log in by inputting the appropriate login credentials.

As can be seen by reference number 22, to perform the verification, the user device 6 may capture a unique identifier 24 of the locking device 4. For example, the firmware management application may have a camera feature, allowing an image of the unique identifier 24 to be captured within the firmware management application. To provide another example, the unique identifier 24 may be captured using a camera of the user device 6. Access to the image captured may be provided to the firmware management application. The unique identifier 24 may be any indicia or indicium that uniquely identifies the user device 6. In the example shown, the unique identifier 24 is a serial number (e.g., serial number 110A SL400). In other situations, the unique identifier 24 may be another kind of distinctive tagging, marking, combination of characters (e.g., words, numbers, symbols, etc.), and/or the like.

As shown by reference number 26, the user device 6 may provide a verification request to a firmware management platform 28. For example, the firmware management platform 28 may support the firmware management application and the user device 6 may transmit the unique identifier 24 as part of a verification request. This will allow the firmware management platform 28 to verify whether the locking device 4 is a registered lock.

As shown by reference number 30, the firmware management platform 28 may verify the locking device 4 using the unique identifier 24. For example, the firmware management platform 28 may have access to a data structure used to store unique identifiers for locking devices 4 that have been registered. The firmware management platform 28 may compare the unique identifier 24 with unique identifiers stored via the data structure and may verify the locking device 4 based on the unique identifier 24 matching a corresponding stored unique identifier.

As shown by reference number 32, the firmware management platform 28 may provide a verification response to the user device 6. If the unique identifier 24 matches a corresponding stored unique identifier, the firmware management platform 28 may provide the user device 6 with a verification response indicating that the locking device 4 has been verified. If the unique identifier 24 does not match a corresponding stored unique identifier, the firmware management platform 28 may provide the user device 6 with a verification response indicating that the locking device 4 was unable to be verified.

In this way, the user device 6 uses the unique identifier 24 of the locking device 4 to verify that the locking device 4 is a registered lock.

As shown in FIG. 1C, and by reference number 34, the user device 6 may display data identifying a collection of firmware packages. For example, the firmware management application may include a user interface that allows users to purchase different firmware packages and the user device 6 may provide, for display on the user interface, data identifying a collection of firmware packages that are available for purchase.

A firmware package, as used herein, may refer to any combination of firmware features that are available to the user. In some embodiments, pre-configured firmware packages may be created and provided for display on the user interface. Additionally, or alternatively, the user may be permitted to select custom combinations of individual firmware features to create a new firmware package.

In some embodiments, a firmware package may include a firmware feature specifying a permissible number of user accounts that may be created for the locking device 4. For example, the locking device 4 may have default firmware installed that allows for two user accounts to be created, where each user account provides a user with access to the locking device 4. However, the firmware packages displayed via the firmware management application may each include a firmware feature specifying a different permissible number of user accounts that may be created to provide access the locking device 4, such as four user accounts, eight user accounts, ten user accounts, etc. Additionally, or alternatively, the firmware package may include one or more other firmware features, such as a firmware feature specifying a time delay (i.e., an amount of time that has to pass after an access code has been entered before the locking device 4 opens), a firmware feature providing audit trail tracking, a firmware feature providing a temporary access code, a firmware feature providing biometric authentication, a firmware feature providing remote locking/unlocking capabilities of the locking device 4, a firmware feature providing automatic locking (e.g., which can be set via time delay), a firmware feature requiring multifactor authentication to lock/unlock the locking device 4, a firmware feature specifying permissible times during which a user can access the locking device 4, a firmware feature indicating a remaining amount of battery left on the keypad 12 of the locking device 4, and/or the like. It is to be understood that this is provided by way of example. In practice, any number of different firmware features may be implemented.

In the example shown by reference number 36, the user interface includes a first firmware package, a second firmware package, . . . , an Nth firmware package. The first firmware package may permit four user accounts to be created for accessing the locking device 4, the second firmware package may permit eight user accounts to be created for accessing the locking device 4 and may include a firmware feature providing a time delay, and the Nth firmware package may permit forty-nine user accounts to be created for accessing the locking device 4 and may include a firmware feature for audit trail tracking.

As shown by reference number 38, a user may interact with the user interface to select a firmware package. In the example shown by reference number 40, the user may select firmware package N, which includes a firmware feature allowing for forty-nine users to be created for accessing the locking device 4, and includes a firmware feature for audit trail tracking.

In some embodiments, the user device 6 may display only firmware packages applicable to the locking device 4. For example, assume the unique identifier 24 identifies a type or model of the locking device 4. In this case, because the unique identifier 24 has been provided to the firmware management platform 28, the platform 28 may locate a subset of available firmware packages that are applicable to locks of the identified type or model. This data may be provided to the user device 6 and may be displayed on the user interface of the firmware management application. In this way, the set of firmware packages displayed may be updated with a subset of firmware packages that are applicable to the locking device 4.

As shown in FIG. 1D, and by reference number 42, the user device 6 may provide, to the firmware management platform 28, transaction information for the selected firmware package. The transaction information may include information identifying an account associated with the user, information identifying the selected firmware package, information identifying a price of the selected firmware package, payment information of the user, token data for a token package that includes one or more tokens capable of being claimed to activate a download for a selected firmware package, and/or the like. The transaction information may be secured using one or more data encryption techniques known in the art.

As shown by reference number 44, the firmware management platform 28 may provide a transaction processing request to a transaction server 46. For example, the firmware management platform 28 may act as an intermediary between the user device 6 and the transaction server 46, and may provide the transaction information to the transaction server 46. The transaction server 46 may process the transaction information included in the request to cause an account associated with the user (e.g., an account of the user, an account of an organization that employs the user, etc.) to be charged for the selected firmware package.

As shown by reference number 48, the transaction server 46 may provide the transaction confirmation to the firmware management platform 28. For example, the transaction server 46 may process the transaction and may generate and provide the firmware management platform 28 with a transaction confirmation indicating that the transaction has been processed successfully.

In some embodiments, the user device 6 may communicate with the transaction server 46 directly to process the transaction. For example, a user interface of the firmware management application may display a link to a third party service capable of processing the transaction. After the transaction has been completed, the user device 6 may provide confirmation of the transaction to the firmware management platform 28.

Figure 1E:
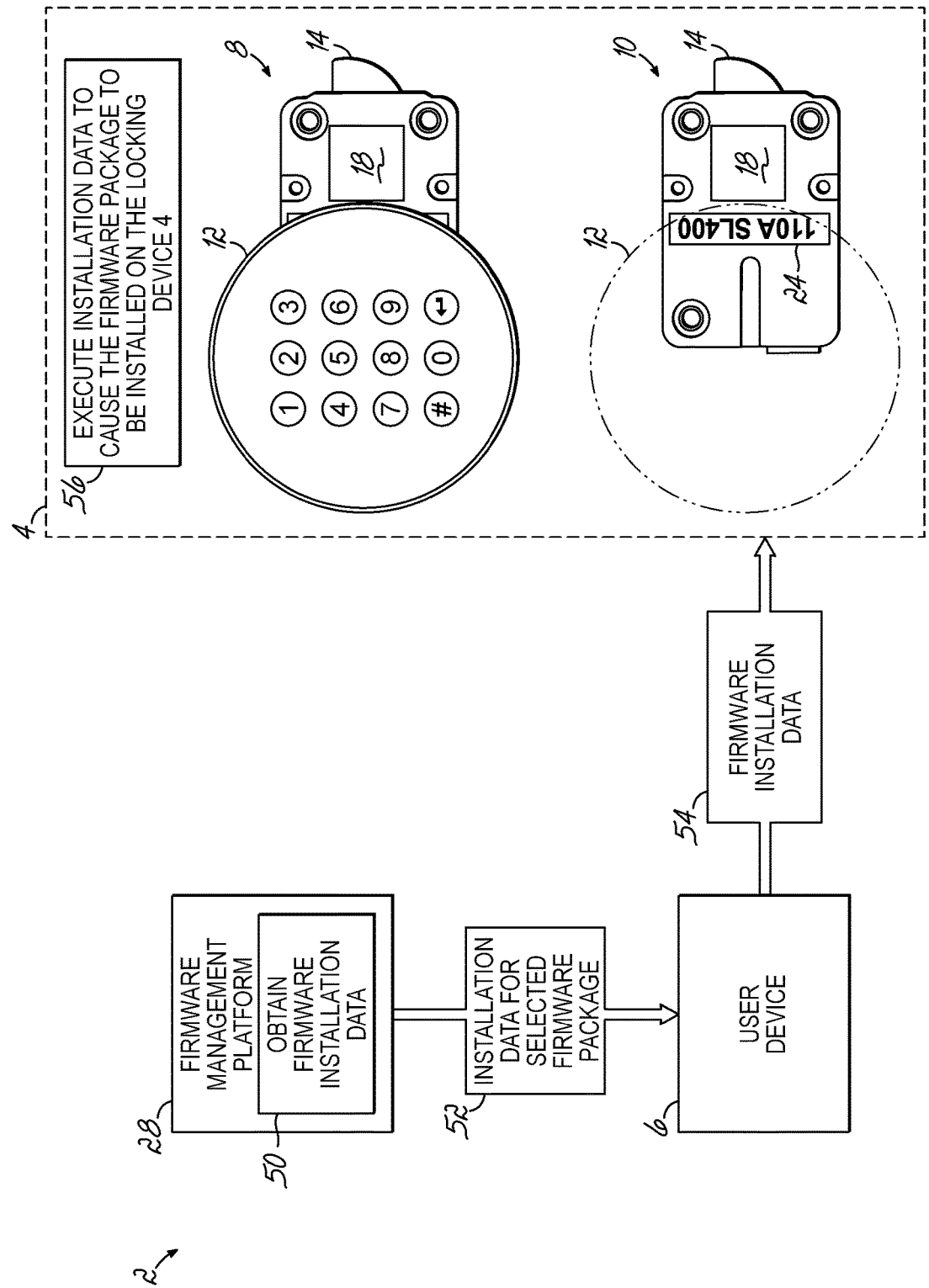

As shown in FIG. 1E, and by reference number 50, the firmware management platform 28 may obtain installation data for the selected firmware package. For example, the firmware management platform 28 may have access to stored installation data for different firmware packages, and may, based on receiving confirmation of the transaction, obtain and transmit the installation data for the selected firmware package to the user device 6. This is shown using reference number 52.

As shown by reference number 54, the user device 6 may provide the installation data for the selected firmware package to the locking device 4. For example, the user device 6 may provide the installation data for the selected firmware package to the locking device 4 via the connection established and discussed in connection with FIG. 1A.

As shown by reference number 56, the locking device 4 may execute the installation data to cause the firmware features included in the firmware package to be installed on the locking device 4. For example, a processor of the locking device 4 may execute instructions included in the installation data, causing any default or existing firmware of the locking device 4 to be updated to include the firmware features of the selected firmware package.

As used herein, "updating" firmware of the locking device 4 is to include installing new firmware features (i.e., features not currently part of the firmware of the locking device 4), uninstalling existing firmware features, and/or replacing existing firmware features with new firmware features. In the example shown in FIGS. 1A-1E, the default firmware of the locking device 4 includes a firmware feature that allows for two user accounts to be created to obtain access to the locking device 4. When the firmware package is installed onto the user device 6, the firmware of the locking device 4 is updated such that forty-nine user accounts may now be created to give forty-nine different users access to the locking device 4. Furthermore, the firmware is updated such that an audit trail tracking feature is now available to the users. In some embodiments, different users may have different access levels and particular firmware features may be available only to users with a certain access level.

Figure 2A:
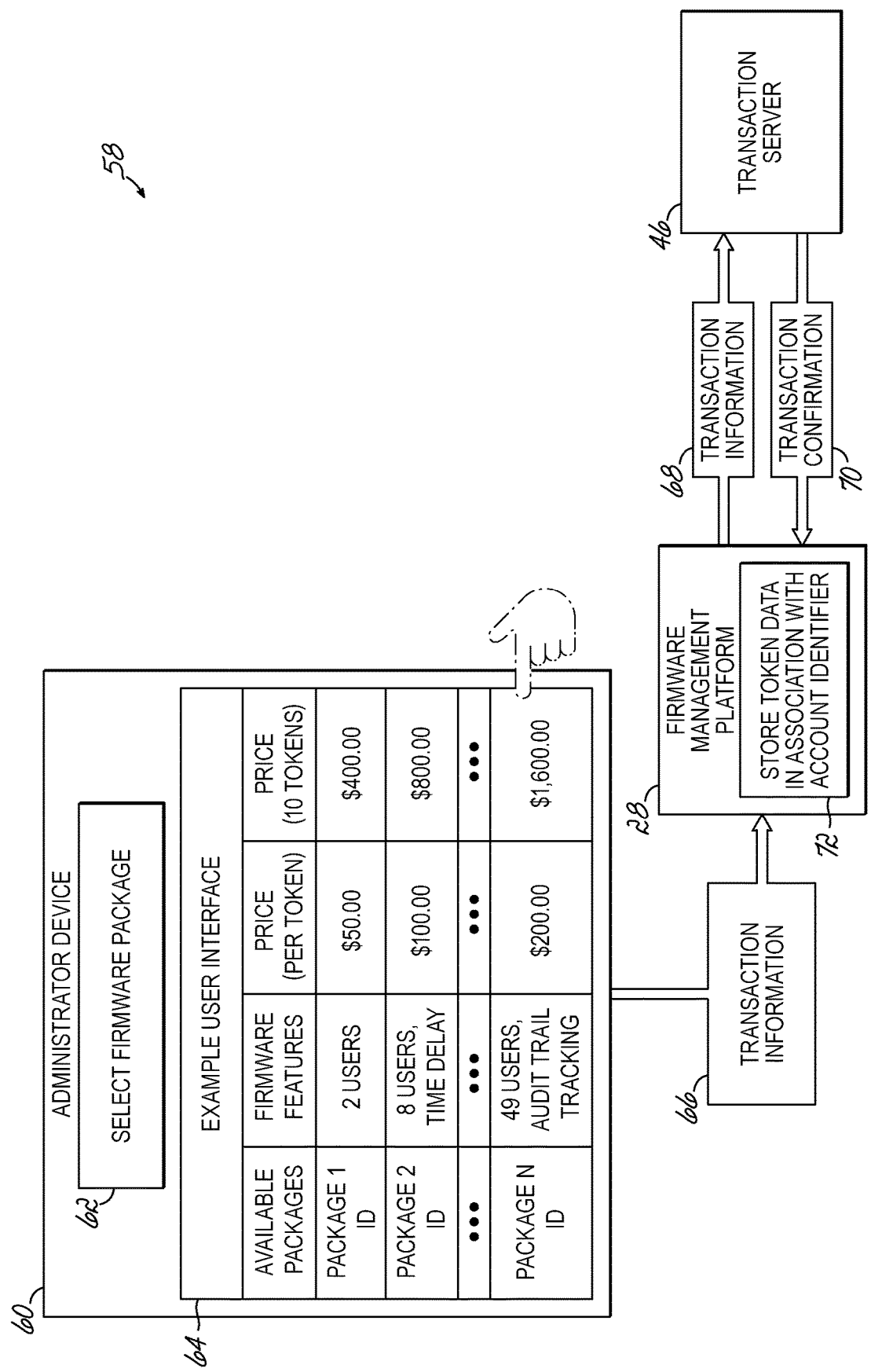
FIGS. 2A-2C are diagrams of an example process for customizing and updating firmware of multiple locking devices.
Figure 2B:
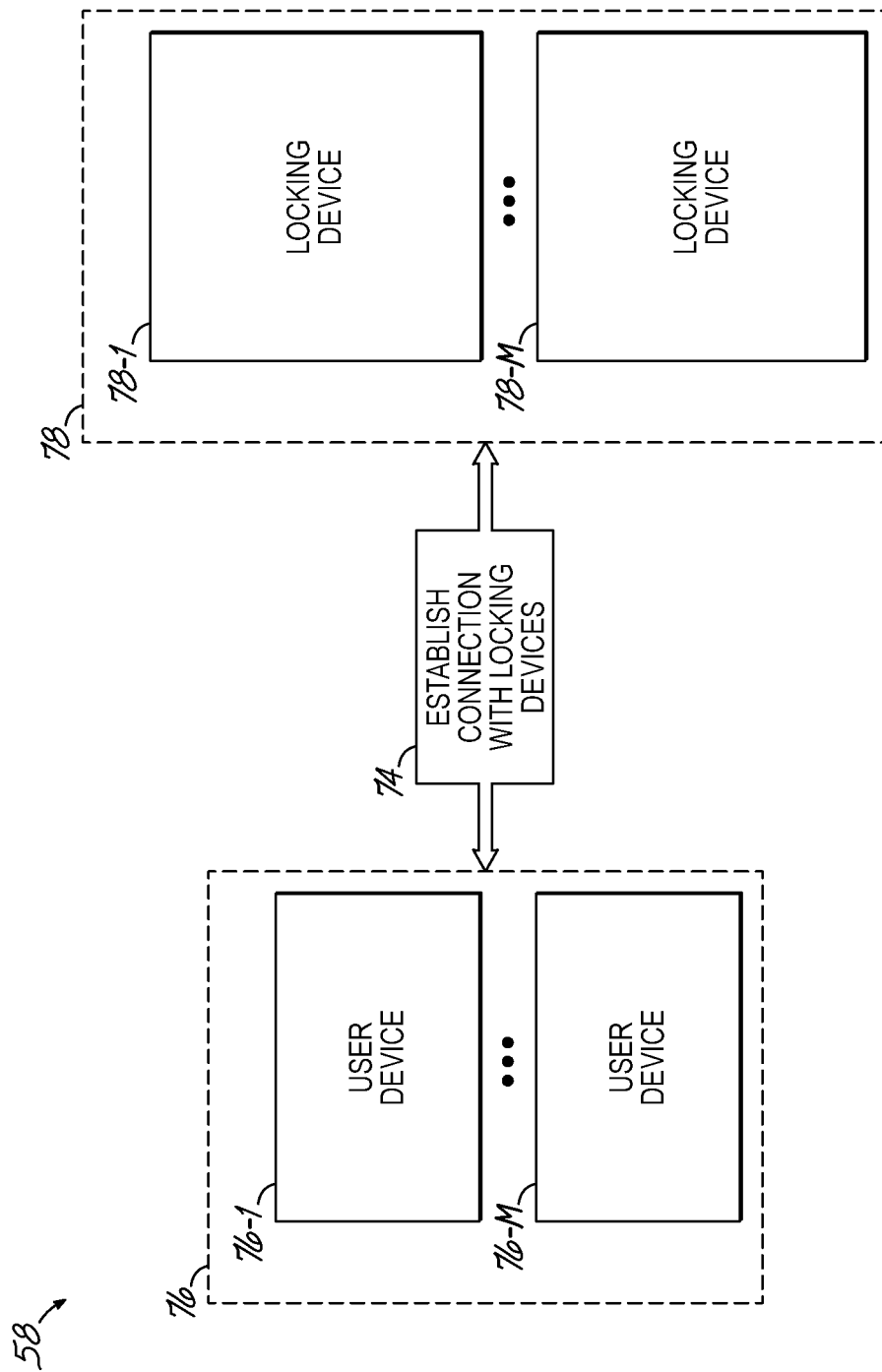
Figure 2C:
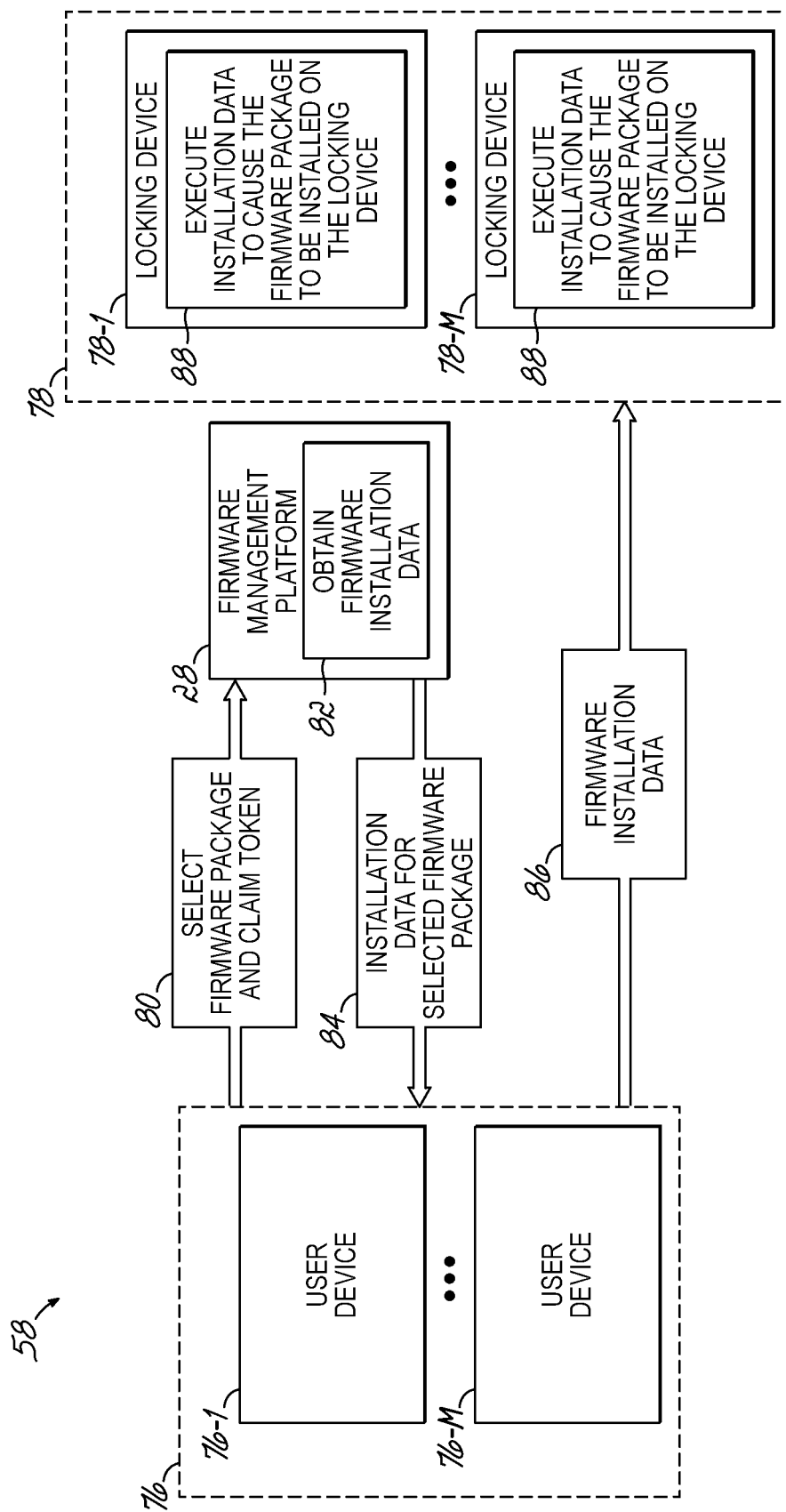

FIGS. 2A-2C are diagrams of an example process 58 for customizing and updating firmware of multiple locking devices.

As shown in FIG. 2A, an administrator device 60 may communicate with the firmware management platform 28 and/or the transaction server 46 to select and purchase a firmware package. For example, and as shown by reference number 62, a user, such as an administrator, may interact with a user interface of the firmware management application to select a firmware package from a list of available firmware packages. The administrator may, for example, be part of an organization and may have authorization to make bulk purchasing decisions on behalf of the organization. As will be shown, this allows the administrator to purchase a token package with one or more tokens that may be applied to specific locking devices owned by the organization.

In the example user interface shown by reference number 64, the administrator may select ten tokens for $1,600.00 and the tokens may correspond to a firmware package that allows for forty-nine user accounts to be created for a given locking device. The selected firmware package also provides for audit trail tracking.

In the embodiment shown, each token package is linked to a particular firmware package. In other embodiments, a firmware package may be assigned a general token value and purchased tokens may be applied to claim any number of different firmware packages.

As shown by reference number 66, the administrator device 60 may provide transaction information to the firmware management platform 28. For example, the administrator device 60 may provide transaction information for the selected firmware package and/or for a selected quantity of tokens. As shown by reference number 68, the firmware management platform 28 may provide transaction information to the transaction server 46, causing the transaction server 46 to process the transaction. After the transaction has been processed, and as shown by reference number 70, the transaction server 46 may provide a transaction confirmation to the firmware management platform 28.

As shown by reference number 72, the firmware management platform 28 may store token data in association with an account identifier. For example, the token data may be stored in association with an account identifier so that the tokens purchased for the selected firmware package are accessible via the account with the firmware management application. The account identifier may be an account for the administrator, for an organization that employs the administrator, or for another authorized user.

As shown in FIG. 2B, and by reference number 74, a group of user devices 76 (e.g., user device 76-1, ..., user device 76-M) may connect with a corresponding group of locking devices 78 (e.g., locking device 78-1, ..., locking device 78-M). For example, an organization may own a group of locking devices 78 that are located at different sites. At each site, a user device 76 may establish a connection with a corresponding locking device 78. The connection may be established in a manner described in connection with FIG. 1A.

As shown in FIG. 2C, and by reference number 80, users operating each respective user device 74 may launch the firmware management application, select a firmware package, and obtain the firmware package by claiming a token associated the account registered to the firmware management application. When a user selects a firmware package and chooses to pay for the firmware package by claiming a token, data identifying the selected firmware package and token selection data may be provided to the firmware management platform 28.

As shown by reference number 82, each time a user selects a firmware package and claims a token, the firmware management platform 28 may obtain the firmware installation data for the selected firmware package. Furthermore, the firmware management platform 28 may update the stored token data to reflect that one of the tokens has been claimed. As shown by reference number 84, the firmware management platform 28 may provide installation data for the selected firmware package to each user device 74.

As shown by reference number 86, each user device 74 may provide the installation data to the corresponding locking device 78. As shown by reference number 88, each locking device 78 may execute the installation data to cause the firmware package to be installed onto the respective locking device 78.

In this way, if an organization owns a large volume of locking devices 78, an administrator or manager of the organization may make bulk purchasing decisions on firmware packages, while on-site employees at various worksites can orchestrate the process of installing the firmware packages onto each respective locking device 78.

Figure 3:
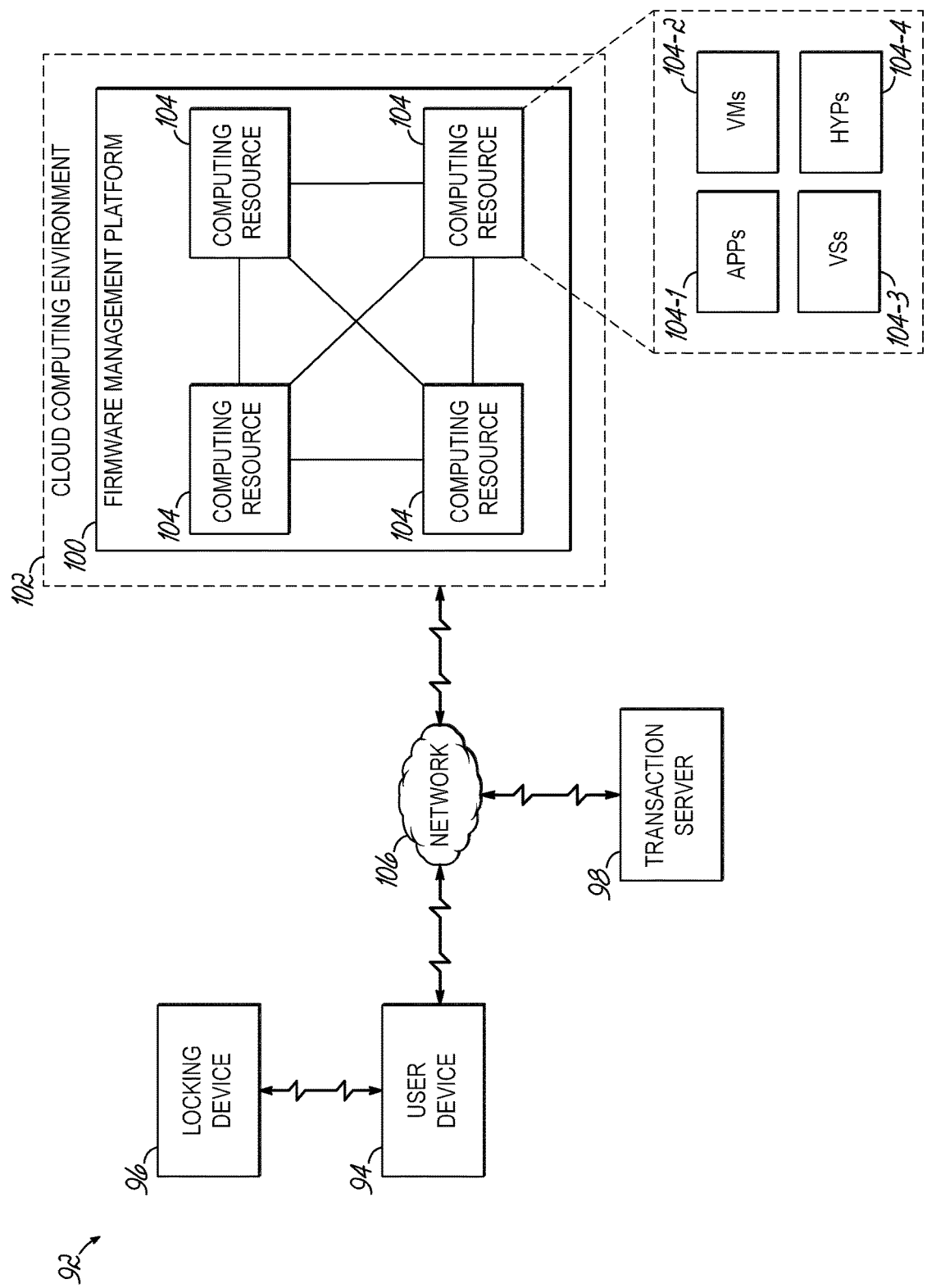
FIG. 3 is a diagram of an example environment in which systems and/or methods described herein may be implemented.

FIG. 3 is a diagram of an example environment 92 in which systems and/or methods described herein may be implemented. As shown in FIG. 3, environment 92 may include a user device 94, a locking device 96, a transaction server 98, a firmware management platform 100 supported within a cloud computing environment 102 (e.g., which includes computing resources 104), and/or a network 106. Devices of environment 92 may interconnect via wired connections, wireless connections, or a combination of wired and wireless connections. User device 94 may correspond to user device 6 and/or to administrator device 60. Locking device 96 may correspond to locking device 4. Firmware management platform 100 may correspond to firmware management platform 28.

User device 94 includes one or more components capable of receiving, generating, storing, processing, and/or providing data associated with the firmware of the locking device 96. User device 94 may include a device, such as a mobile phone (e.g., a smart phone, etc.), a tablet computer (e.g., an iPad, etc.), a laptop computer, a handheld computer, a server computer, a wearable communication device (e.g., a smart wristwatch, a pair of smart eyeglasses, etc.), a gaming device, or a similar type of device.

In some embodiments, the user device 94 may be configured with or have access to a firmware management application. The firmware management application may be installed locally on the user device 94 or may be a web application that is accessed via the Internet. In some embodiments, the firmware management application includes one or more user interfaces that allow a user to view firmware packages and/or firmware features available for purchase, to view the cost associated with each respective firmware package and/or firmware feature, and to select a firmware package or firmware feature for purchase. Additionally, or alternatively, the firmware management application includes one or more user interfaces that allow the user to download and install the purchased firmware package or firmware feature onto the locking device 96.

In some embodiments, the user device 94 may be configured to communicate with the locking device 96 via a communication interface. For example, the user device 94 may establish a Bluetooth communication session with the circuitry of the locking device 96 and may communicate via a Bluetooth communication session. Additionally, or alternatively, the user device 94 may communicate with the circuitry of the locking device 96 using an application programming interface (API) that is part of the firmware management application. In some embodiments, the user device 94 may communicate with the locking device 96 via a wired interface.

Locking device 96 includes a body, a locking mechanism, a power source, and circuitry. The circuitry may be capable of controlling the locking mechanism, as well as receiving, storing, processing, and/or providing data associated with the firmware of the locking device 96. The locking device 96 may be a swing bolt lock, a dead bolt lock, a motor bolt lock, a spring bolt lock, and/or another type of lock.

The locking mechanism may be mechanical, electrical, or a combination thereof. For example, the locking mechanism may be a rotating dial, a latch controlled via a keypad, and/or another type of locking mechanism (e.g., a mechanism utilizing biometrics, radio frequency identification (RFID), etc.). In some embodiments, the locking system may be controlled via circuitry of the locking device 96. For example, the locking mechanism may include a latch and a keypad. When a user inputs interacts with the keypad to input an access code, the circuitry of the locking device 96 may send one or more signals causing the latch to move into a locked or unlocked position.

In some embodiments, the keypad may be a separate device from the user device 94 and the locking device 96. For example, the keypad may be plugged into or connected to the lock and may act as an intermediary between the firmware management application and the locking device 96.

In some embodiments, the circuitry may be configured to communicate with the user device 94. For example, the circuitry may include a transceiver that permits communication between the user device 94 and the locking device 96. To provide a specific example, the transceiver may be a Bluetooth transceiver, allowing the user device 94 and the locking device 96 to communicate via a Bluetooth communication session. In other embodiments, communications between the user device 94 and the locking device 96 may utilize one or more other communication interfaces, such as API, the Internet, and/or the like. In some embodiments, the circuitry may be configured to connect to the Internet to communicate with one or more other devices, such as the transaction server 98 and/or the firmware management platform 100.

The power source may include one or more batteries used to provide power to the locking device 96. In one embodiment, the power source is a 9-volt battery. In another embodiment, the power source is two 9-volt batteries. One of ordinary skill in the art can appreciate that the specific voltage required will vary depending on the type of lock being implemented and the ways in which the lock is used.

Transaction server 98 includes one or more components capable of receiving, generating, storing, processing, and/or providing data associated with a transaction involving firmware of the locking device 96. The transaction server 98 may include a server device or a group of server devices. In some embodiments, the transaction server 98 may be configured to communicate with the user device 94. For example, the transaction server 98 may communicate with the user device 94 via network 106. This allows the transaction server 98 to process transaction information provided by the user device 94 and to provide the user device 94 with an indication of whether the transaction has been processed successfully. In some embodiments, the transaction server 98 and the user device 94 may communicate directly. In some embodiments, the firmware management platform 100 may serve as an intermediary for communications between the user device 94 and the transaction server 98.

Firmware management platform 100 includes one or more devices and/or components capable of receiving, storing, processing, and/or providing data associated with the firmware of the locking device 96. Firmware management platform 100 may include a server device (e.g., a host server, a web server, an application server, etc.), a data center device, or a similar device.

In some embodiments, as shown, the firmware management platform 100 may be hosted in the cloud computing environment 102. Notably, while embodiments described herein describe the firmware management platform 100 as being hosted in the cloud computing environment 102, in some embodiments, the firmware management platform 100 may not be cloud-based (i.e., may be implemented outside of a cloud computing environment) or may be partially cloud-based.

Cloud computing environment 102 includes an environment that hosts firmware management platform 100. Cloud computing environment 102 may provide computation, software, data access, storage, etc. services that do not require end-user knowledge of a physical location and configuration of system(s) and/or device(s) that hosts the firmware management platform 100. As shown, the cloud computing environment 102 may include a group of computing resources 104 (referred to collectively as "computing resources 104" and individually as "computing resource 104").

Computing resource 104 includes one or more personal computers, workstation computers, server devices, or another type of computation and/or communication device. In some embodiments, the computing resource 104 may host the firmware management platform 100. The cloud resources may include compute instances executing in the computing resource 104, storage devices provided in the computing resource 104, data transfer devices provided by the computing resource 104, and/or the like. In some embodiments, the computing resource 104 may communicate with other computing resources 104 via wired connections, wireless connections, or a combination of wired and wireless connections.

As further shown in FIG. 3, computing resource 104 may include a group of cloud resources, such as one or more applications (APPs) 104-1, one or more virtual machines (VMs) 104-2, virtualized storage (VSs) 104-3, one or more hypervisors (HYPs) 104-4, and/or the like.

Application 104-1 may include one or more software applications that may be provided to or accessed by the user device 94, the locking device 96, the transaction server 98, and/or the firmware management platform 100. Application 104-1 may eliminate a need to install and execute the software applications on these devices. In some embodiments, one application 104-1 may send/receive information to/from one or more other applications 104-1, via virtual machine 104-2. In some embodiments, application 104-1 may be a firmware management application. The firmware management application may include one or more user interfaces that, when displayed on the user device 94, permit a user to view and purchase firmware. The application 104-1 may also be used to orchestrate installation of the firmware onto the locking device 96.

Virtual machine 104-2 may include a software implementation of a machine (e.g., a computer) that executes programs like a physical machine. Virtual machine 104-2 may be either a system virtual machine or a process virtual machine, depending upon use and degree of correspondence to any real machine by virtual machine 104-2. A system virtual machine may provide a complete system platform that supports execution of a complete operating system ("OS"). A process virtual machine may execute a single program and may support a single process. In some embodiments, virtual machine 104-2 may execute on behalf of another device (e.g., user device 94), and may manage infrastructure of the cloud computing environment 102, such as data management, synchronization, or long-duration data transfers.

Virtualized storage 104-3 may include one or more storage systems and/or one or more devices that use virtualization techniques within the storage systems or devices of the computing resource 104. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 104-4 may provide hardware virtualization techniques that allow multiple operating systems (e.g., "guest operating systems") to execute concurrently on a host computer, such as computing resource 104. Hypervisor 104-4 may present a virtual operating platform to the guest operating systems and may manage the execution of the guest operating systems.

Network 106 may include one or more wired and/or wireless networks. For example, network 106 may include a cellular network (e.g., a fifth generation (5G) network, a fourth generation (4G) network, such as a long-term evolution (LTE) network, a third generation (3G) network, and/or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 92 may perform one or more functions described as being performed by another set of devices of environment 92.

Figure 4:
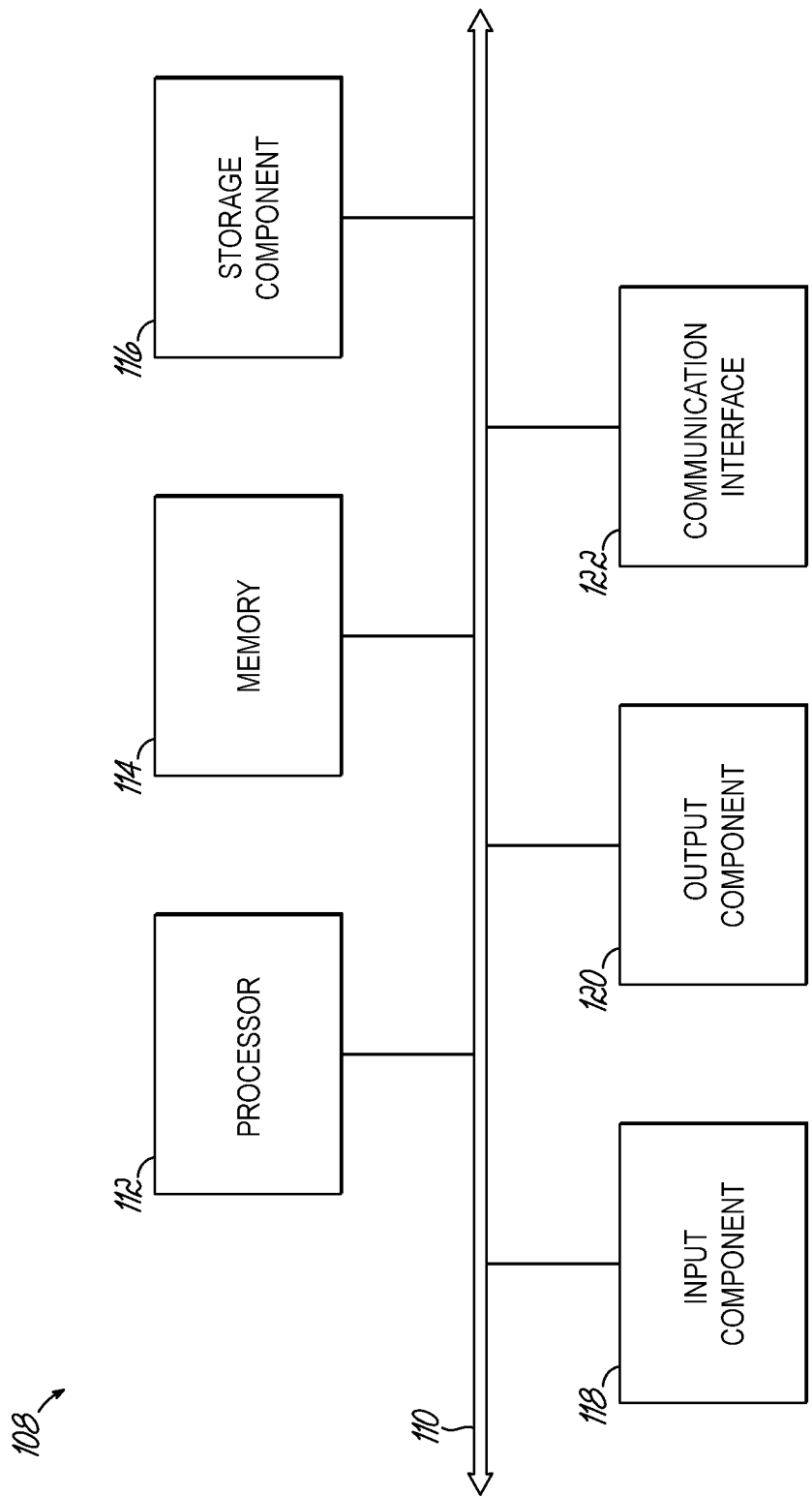
FIG. 4 is a diagram of example components of one or more devices of FIG. 3.

FIG. 4 is a diagram of example components of a device 108. Device 108 may correspond to the user device 94, the locking device 96, the transaction server 98, and/or the firmware management platform 100. In some embodiments, the user device 94, the locking device 96, the transaction server 98, and/or the firmware management platform 100 may include one or more devices 108 and/or one or more components of device 108. As shown in FIG. 4, device 108 may include a bus 110, a processor 112, a memory 114, a storage component 116, an input component 118, an output component 120, and/or a communication interface 122.

Bus 110 includes a component that permits communication among multiple components of device 108. Processor 112 is implemented in hardware, firmware, and/or a combination of hardware and software. Processor 112 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some embodiments, processor 112 includes one or more processors capable of being programmed to perform a function. Memory 114 includes a random-access memory (RAM), a read only memory (ROM), and/or another type of dynamic or static storage device (e.g., a flash memory, a magnetic memory, and/or an optical memory) that stores information and/or instructions for use by processor 112.

Storage component 116 stores information and/or software related to the operation and use of device 108. For example, storage component 116 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 118 includes a component that permits device 108 to receive information, such as via user input (e.g., a touch screen display, a keyboard, a keypad, a mouse, a button, a switch, and/or a microphone). Additionally, or alternatively, input component 118 may include a sensor for sensing information (e.g., a global positioning system (GPS) component, an accelerometer, a gyroscope, and/or an actuator). Output component 120 includes a component that provides output information from device 108 (e.g., a display, a speaker, and/or one or more light-emitting diodes (LEDs)).

Communication interface 122 includes a transceiver-like component (e.g., a transceiver and/or a separate receiver and transmitter) that enables device 108 to communicate with other devices, such as via a wired connection, a wireless connection, or a combination of wired and wireless connections. Communication interface 122 may permit device 108 to receive information from another device and/or provide information to another device. For example, communication interface 122 may include an Ethernet interface, an optical interface, a coaxial interface, an infrared interface, a radio frequency (RF) interface, a universal serial bus (USB) interface, a Wi-Fi interface, a cellular network interface, or the like.

Device 108 may perform one or more processes described herein. Device 108 may perform these processes based on processor 112 executing software instructions stored by a non-transitory computer-readable medium, such as memory 114 and/or storage component 116. A computer-readable medium is defined herein as a non-transitory memory device. A memory device includes memory space within a single physical storage device or memory space spread across multiple physical storage devices.

Software instructions may be read into memory 114 and/or storage component 116 from another computer-readable medium or from another device via communication interface 122. When executed, software instructions stored in memory 114 and/or storage component 116 may cause processor 112 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 4 are provided as an example. In practice, device 108 may include additional components, fewer components, different components, or differently arranged components than those shown in FIG. 4. Additionally, or alternatively, a set of components (e.g., one or more components) of device 108 may perform one or more functions described as being performed by another set of components of device 108.

Figure 5:
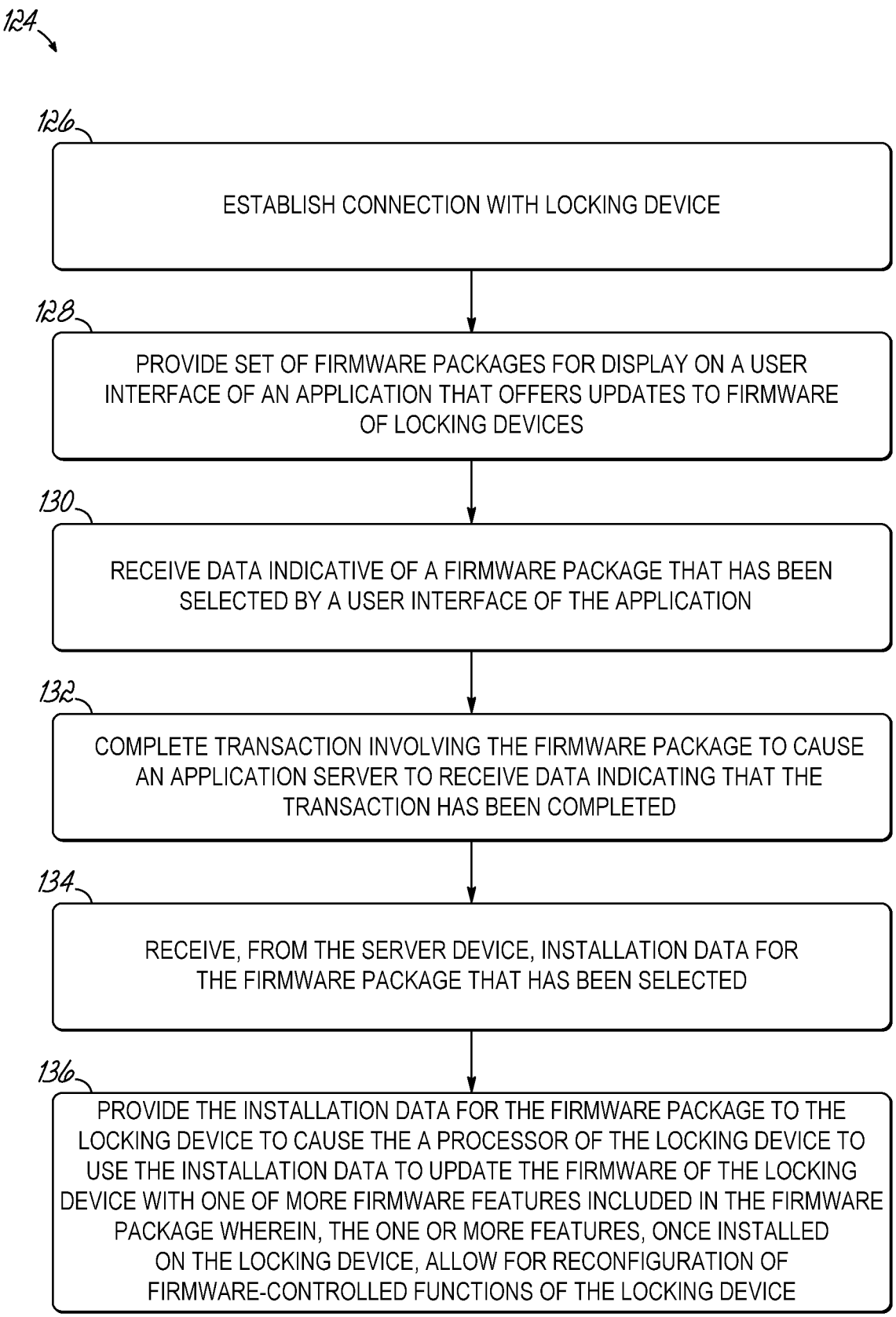
FIG. 5 is a flowchart of an example process for customizing and updating firmware of a locking device according to the principles of the present disclosure.

FIG. 5 is a flowchart of an example process 124 for updating the firmware of a locking device. A user device (e.g., the user device 6, the user device 94, etc.) may establish a connection with the locking device (e.g., the locking device 4, the locking device 96, etc.) (block 126). For example, the user device may establish a connection with the locking device using a wired connection or a wireless connection such as Bluetooth.

In some embodiments, a user may input login credentials to access a firmware management application. By requiring the user to input login credentials to access the firmware management application, an additional layer of security is provided by verifying that the user is an authorized user. For example, if an unauthorized user were to directly connect to the locking device, the unauthorized user would have no way of accessing an account with the firmware management application and therefore would be unable to access the firmware updates for the locking device.

The user device may provide a set of firmware packages for display on a user interface of an application that offers updates to firmware of locking devices (block 128). For example, the user device may have access to a firmware management application that can be used to obtain new firmware for the locking device.

The user device may receive data indicative of a firmware package, of the set of firmware packages, that has been selected via the user interface of the application (block 130). For example, a user may interact with the user interface to select a firmware package. Once selected, the processor of the user device may receive data indicating the firmware package that the user has selected. The data indicative of the selected firmware package may, for example, be a firmware package identifier, one or more firmware feature identifiers, and/or any other data indicative of the user selecting a particular firmware package.

The user device may complete a transaction involving the firmware package to cause an application server to receive data indicating that the transaction has been completed (block 132). For example, the user device may communicate with a transaction server to process the transaction involving the firmware package selected by the user. The transaction may be completed when the transaction server authorizes payment information provided by the user device. When the transaction has been completed, the user device or the transaction server may provide the application server with data indicating that the transaction has been completed. This may trigger the application server to provide the user device with the installation data needed to install the firmware package onto the locking device.

The user device may receive, from the application server, installation data for the firmware package that has been selected (block 134). For example, the application server may provide the user device with the installation data over a network such as the Internet.

The user device may provide the installation data for the firmware package to the locking device to cause a processor of the locking device to use the installation data to update the firmware of the locking device with one or more firmware features included in the firmware package, wherein the one or more firmware features, once installed on the locking device, allow for reconfiguration of firmware-controlled functions of the locking device (block 136). For example, the user device may provide the installation data to the locking device using the connection established in block 126. Next, the processor of the locking device may execute instructions included in the installation data to install the firmware package onto the locking device. Once the installation has been completed, the locking device may be reconfigured based on the one or more firmware features that were included in the firmware package.

The foregoing disclosure provides illustration and description but is not intended to be exhaustive or to limit the embodiments to the precise form disclosed. Modifications and variations may be made in light of the above disclosure or may be acquired from practice of the embodiments.

Certain user interfaces have been described herein and/or shown in the figures. A user interface may include a graphical user interface, a non-graphical user interface, a text-based user interface, etc. A user interface may provide information for display. In some embodiments, a user may interact with the information, such as by providing input via an input component of a device that provides the user interface for display. In some embodiments, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, and/or a combination of hardware and software. The actual specialized control hardware or software code used to implement these systems and/or methods is not limiting of the embodiments. Thus, the operation and behavior of the systems and/or methods were described herein without reference to specific software code—it being understood that software and hardware can be used to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

While one or more embodiments of the present invention have been described in detail, it should be apparent that modifications and variations thereto are possible, all of which fall within the true spirit and scope of the invention. Therefore, the foregoing is intended only to be illustrative of the principles of the invention. Further, since numerous modifications and changes will readily occur to those skilled in the art, it is not intended to limit the invention to the exact construction and operation shown and described. Accordingly, all suitable modifications and equivalents may be included and considered to fall within the scope of the invention, defined by the following claim or claims.

What is claimed is:

1. A method for updating firmware of a locking device, comprising:
   establishing a connection between a user device and the locking device;
   providing, by the user device, a set of firmware packages for display on a user interface of an application that offers updates to firmware of locking devices;
   receiving, by the user device, data indicative of a firmware package, of the set of firmware packages, that has been selected via the user interface of the application;
   completing, by the user device, a transaction involving the firmware package to cause an application server to receive data indicating that the transaction has been completed;
   receiving, by the user device and from the application server, installation data for the firmware package that has been selected; and
   providing, by the user device, the installation data for the firmware package to the locking device to cause a processor of the locking device to use the installation data to update the firmware of the locking device with one or more firmware features included in the firmware package, wherein the one or more firmware features, once installed on the locking device, allow for reconfiguration of firmware-controlled functions and operating modes of the locking device by supplementing or replacing original firmware of the locking device.

2. The method of claim 1, further comprising:
   prior to providing the set of firmware features for display on the user interface, obtaining a unique identifier located on a body of the locking device; and providing the unique identifier to the application server to cause the application server to use the unique identifier to verify the locking device and to provide the user device with a response message indicating that the locking device is a registered lock.

3. The method of claim 2, wherein the unique identifier indicates a type or model of the locking device; and wherein the method further comprises:
  receiving, from the application server, data identifying a list of firmware packages that have been recommended based on the type or model of the locking device; and
  updating the set of firmware packages displayed on the user interface based on the data identifying the list of firmware packages that have been recommended.

4. The method of claim 1, wherein providing the set of firmware packages for display on the user interface comprises:
  providing the set of firmware packages for display in association with information identifying a price of each respective firmware package of the set of firmware packages.

5. The method of claim 1, wherein the firmware package, of the set of firmware packages, is a first firmware package; and wherein the method further comprises:
  receiving data indicative of a second firmware package, of the set of firmware packages, that has been selected via the user interface of the application;
  completing a transaction involving the second firmware package to cause the application server to receive data indicating that the transaction involving the second firmware package has been completed;
  receiving, from the application server, installation data for the second firmware package that has been selected; and
  providing the installation data for the second firmware package to the locking device to cause the processor of the locking device to update the firmware of the locking device with one or more firmware features included in the second firmware package.

6. The method of claim 1, further comprising:
  providing, for display on the user interface, a list of token packages, wherein each token package includes one or more tokens and is displayed in association with information identifying a price for the one or more tokens included in the respective token package.

7. The method of claim 6, wherein the set of firmware packages are provided for display on a first portion of the user interface of the application and the list of token packages are provided for display on a second portion of the user interface of the application.

8. The method of claim 1, wherein the one or more firmware features of the firmware package comprises at least one of:
  a feature indicating a number of user accounts permitted to access the locking device,
  a feature providing audit trail tracking,
  one or more time delay features,
  a feature providing biometric authentication,
  a feature providing automatic locking,
  a feature providing multifactor authentication,
  a feature specifying permissible times during which the locking device is capable of being locked or unlocked, or
  a feature indicating a remaining amount of battery left on the locking device.

9. The method of claim 1, wherein the firmware of the locking device, once updated with the one or more firmware features, is programmable from the user device.

10. The method of claim 1, wherein the firmware of the locking device, once updated with the one or more firmware features, is programmable from an interface of the locking device.

11. A user device, comprising:
  a memory storing instructions; and
  a processor that, when executing the instructions, is to:
    establish a connection with a locking device;
    provide a set of firmware packages for display on a user interface of an application that offers updates to firmware of locking devices;
    receive data indicative of a firmware package, of the set of firmware packages, that has been selected via the user interface of the application;
    complete a transaction involving the firmware package to cause an application server to receive data indicating that the transaction has been completed;
    receive, from the application server, installation data for the firmware package that has been selected; and
    provide, via the connection that has been established, the installation data for the firmware package to the locking device to cause a processor of the locking device to use the installation data to update the firmware of the locking device with one or more firmware features included in the firmware package that has been selected via the user interface of the application, wherein the one or more firmware features, once installed on the locking device, allow for reconfiguration of firmware-controlled functions and operating modes of the locking device by supplementing or replacing original firmware of the locking device.

12. The user device of claim 11, wherein the processor, when providing the set of firmware packages for display on the user interface, is to:
  provide the set of firmware packages for display in association with information identifying a price of each respective firmware package of the set of firmware packages.

13. The user device of claim 11, wherein the processor is further to:
  provide, for display on the user interface, a list of token packages, wherein each token package includes one or more tokens and is displayed in association with information identifying a price for the one or more tokens included in the respective token package, wherein the set of firmware packages are provided for display on a first portion of the user interface of the application and the list of token packages are provided for display on a second portion of the user interface of the application.

14. A non-transitory computer-readable medium storing instructions, the instructions including:
  one or more instructions that, when executed by a processor of a device, cause the processor to:
    establish a connection with a locking device;
    provide a set of firmware packages for display on a user interface of an application that offers updates to firmware of locking devices;
    receive data indicative of a firmware package, of the set of firmware packages, that has been selected via the user interface of the application;
    complete a transaction involving the firmware package to cause an application server to receive data indicating that the transaction has been completed;

receive, from the application server, installation data for the firmware package that has been selected; and provide, via the connection that has been established, the installation data for the firmware package to the locking device to cause a processor of the locking device to use the installation data to update the firmware with one or more firmware features included in the firmware package that has been selected, wherein the one or more firmware features, once installed on the locking device, allow for reconfiguration of firmware-controlled functions and operating modes of the locking device by supplementing or replacing original firmware of the locking device.

15. The non-transitory computer-readable medium of claim 14, wherein the one or more instructions, that cause the processor to provide the set of firmware packages for display on the user interface, cause the processor to:

provide the set of firmware packages for display in association with information identifying a price of each respective firmware package of the set of firmware packages.

16. The non-transitory computer-readable medium of claim 14, wherein the one or more instructions, when executed by the processor, further cause the processor to:

provide, for display on the user interface, a list of token packages, wherein each token package includes one or more tokens and is displayed in association with information identifying a price for the one or more tokens included in the respective token package, wherein the set of firmware packages are provided for display on a first portion of the user interface of the application and the list of token packages are provided for display on a second portion of the user interface of the application.

* * * * *